United States Patent [19]
Coenders et al.

[11] 3,899,197
[45] Aug. 12, 1975

[54] CONNECTING ARRANGEMENT FOR CONNECTING TWO VESSELS

[75] Inventors: Willi Coenders; Franz Trockel, both of Essen, Germany

[73] Assignee: Heinrich Koppers Gesellschaft mit beschrankter Haftung, Essen, Germany

[22] Filed: Oct. 25, 1972

[21] Appl. No.: 300,623

[30] Foreign Application Priority Data
Oct. 26, 1971 Germany............................ 2153225
Feb. 23, 1972 Germany............................ 2208479

[52] U.S. Cl.................. 285/14; 126/99 R; 285/227
[51] Int. Cl............................................. F16l 27/02
[58] Field of Search .......... 285/227, 228, 226, 229, 285/301, 13, 299, 300, 224, 225, 14

[56] References Cited
UNITED STATES PATENTS

| | | | |
|---|---|---|---|
| 1,940,729 | 12/1933 | Pfefferle ........................... | 285/13 X |
| 2,014,355 | 9/1935 | Hussman......................... | 285/299 X |
| 2,207,146 | 7/1940 | Fentress et al..................... | 285/300 |
| 2,712,456 | 7/1955 | McCreery........................ | 285/226 X |
| 2,998,270 | 8/1961 | Watkins........................... | 285/227 X |
| 3,214,197 | 10/1965 | Gruber............................ | 285/227 X |
| 3,574,361 | 4/1971 | Contreras........................ | 285/301 X |
| 3,620,557 | 11/1971 | Sturm.............................. | 285/228 |

FOREIGN PATENTS OR APPLICATIONS

| | | | |
|---|---|---|---|
| 1,401,419 | 4/1965 | France............................ | 285/228 |
| 238,971 | 7/1969 | U.S.S.R............................ | 285/301 |

Primary Examiner—Thomas F. Callaghan
Attorney, Agent, or Firm—Michael S. Striker

[57] ABSTRACT

A first tubular socket is connectable to one vessel and has a free end, and a second tubular socket is connectable to another vessel and also has a free end. Each of the free ends is provided with an annular reinforcing member which is rigid with it, and annular shoulders on the reinforcing members engage one behind the other so that the shoulders prevent axial separation of the tubular sockets. The reinforcing members have, however, limited freedom of relative radial movement so that limited relative displacement of the tubular sockets in radial direction is possible.

4 Claims, 3 Drawing Figures

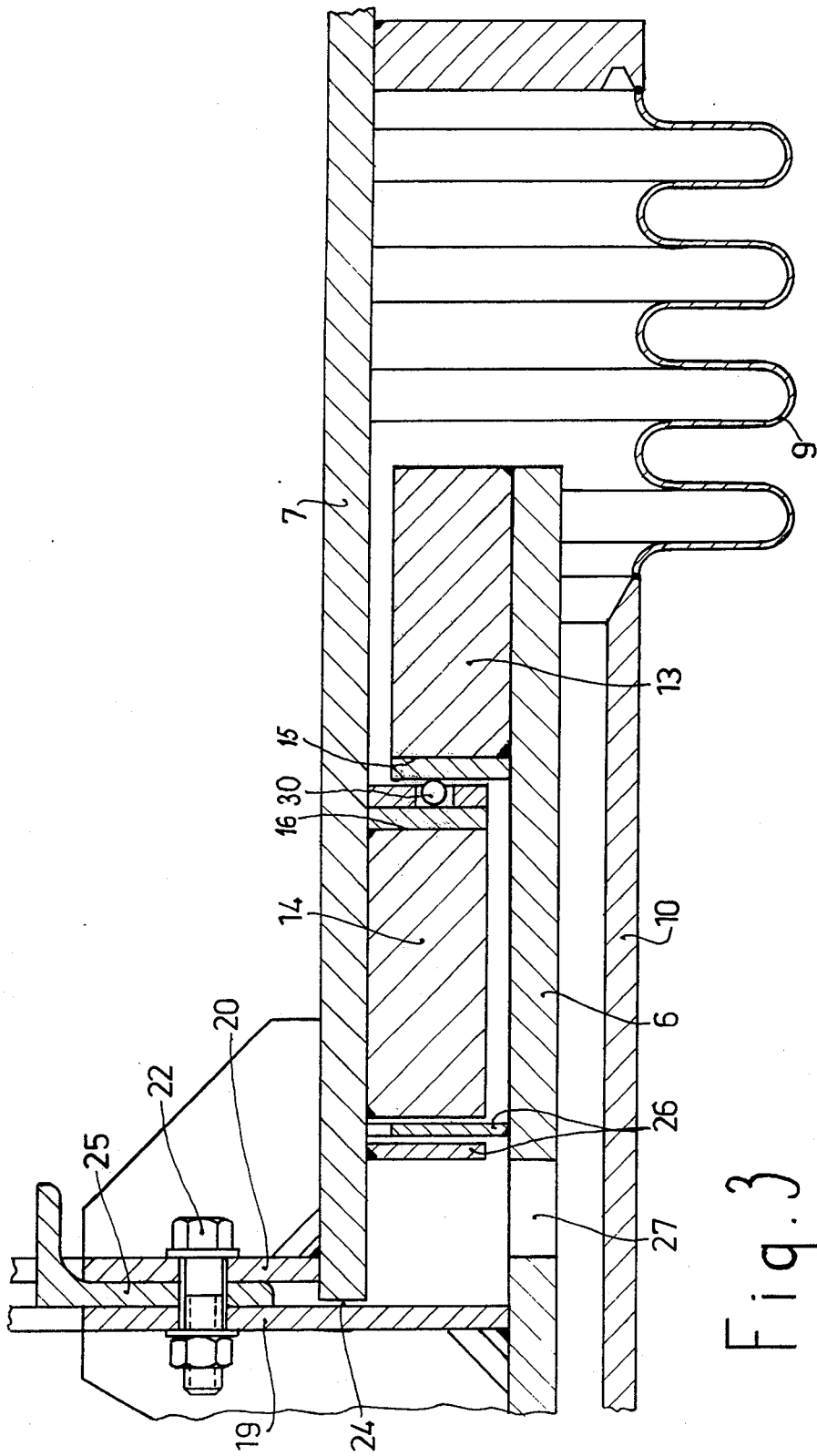

CONNECTING ARRANGEMENT FOR CONNECTING TWO VESSELS

BACKGROUND OF THE INVENTION

The present invention relates to a connecting arrangement, and more particularly to a connecting arrangement for connecting two vessels.

Still more particularly, the invention relates to a connecting arrangement for connecting two vessels which are under elevated interior pressure and/or temperature, and especially of an air heater with a laterally adjacent combustion chamber in a furnace or the like.

In furnaces, for instance, it is common that an air heater or regenerator is arranged laterally adjacent to a furnace or combustion chamber, both of them having an upright orientation. The chamber and the regenerator are connected with one another by tubular sockets between which there is interposed one or more compensating devices. The purpose of such compensating devices is to provide for compensation of radial and axial displacement of the tubular sockets, resulting from thermal expansion and contraction of the sockets and/or the vessels themselves. The forces which act in horizontal direction due to the internal pressures in the vessels and in the tubular sockets, pressures which frequently amount to 5 atms. over pressure and even higher, must be absorbed by appropriately dimensioned fittings on the tubular sockets and other associated components. Evidently, these fittings are relatively expensive, aside from the fact that they necessarily increase the minimum lateral distance which can exist between the regenerator and the combustion chamber. This is undesirable.

SUMMARY OF THE INVENTION

It is therefore a general object of the present invention to overcome the disadvantages of the prior art.

More particularly, it is an object of the present invention to provide a connecting arrangement of the character and for the purposes outlined above, which avoids these disadvantages.

Still more particularly, it is an object of the present invention to provide such a connecting arrangement which is simpler and lighter in its construction than what is known from the prior art, but which is capable of withstanding the forces and thermal expansions and contractions which arise in the conditions in which such an arrangement is to be used.

In keeping with these objects, and others which will become apparent hereafter, one feature of the invention resides in a connecting arrangement of the type under discussion, which comprises a first tubular socket connectable to one vessel and having a free end, and a second tubular socket connectable to another vessel and also having a free end. In addition we provide a pair of annular reinforcing members each of which is rigidly connected with one of the free ends, and these reinforcing members are provided with annular shoulders which bear upon one another for preventing axial separation of the tubular sockets but which define with one another a radial gap sufficient to permit limited relative displacement of the tubular sockets in radial direction.

The inter-engagement between the shoulders, each of which engages behind the other, is claw-like and with the construction according to the present invention the forces resulting from the internal pressures which develop in the vessels and the tubular sockets are absorbed by the tubular sockets themselves, or more particularly, by the annular reinforcing members provided on these sockets. Heretofore it was necessary to provide external fittings, that is anchoring devices in prior-art constructions of the type in question, and this can now be omitted. This results in a not insubstantial reduction of the manufacturing costs, aside from the fact that it saves space which makes it possible to have the vessels closer together than herebefore, a consideration which is particularly important if one of the vessels is a regenerator and the other a combustion chamber, or if the vessels are two regenerators.

The contacting surfaces of the annular shoulders are shifted radially relative to one another during temperature and pressure changes occurring in an arrangement according to the present invention, that is the axis of one tubular socket shifts transversely of and in parallelism with the axis of the associated other tubular socket. In order to be able to obtain a particularly easy displacement of the contacting surfaces of the annular shoulders, it is advantageous to smooth these surfaces, to harden them and to coat them with graphite. It is also possible, however, to provide a rolling displacement between these surfaces, for which purpose a roller or ball bearing may be interposed between these surfaces in contact with them. Thus, in any case, friction-reducing means should advantageously be provided between these surfaces, or whatever type of such friction-reducing means may be chosen in accordance with the comments above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a partly sectioned fragmentary detail view similar to FIG. 2 but illustrating an anti-friction bearing.

DESCRIPTION OF THE PREFERRED EMBODIMENTS

Figure 1:
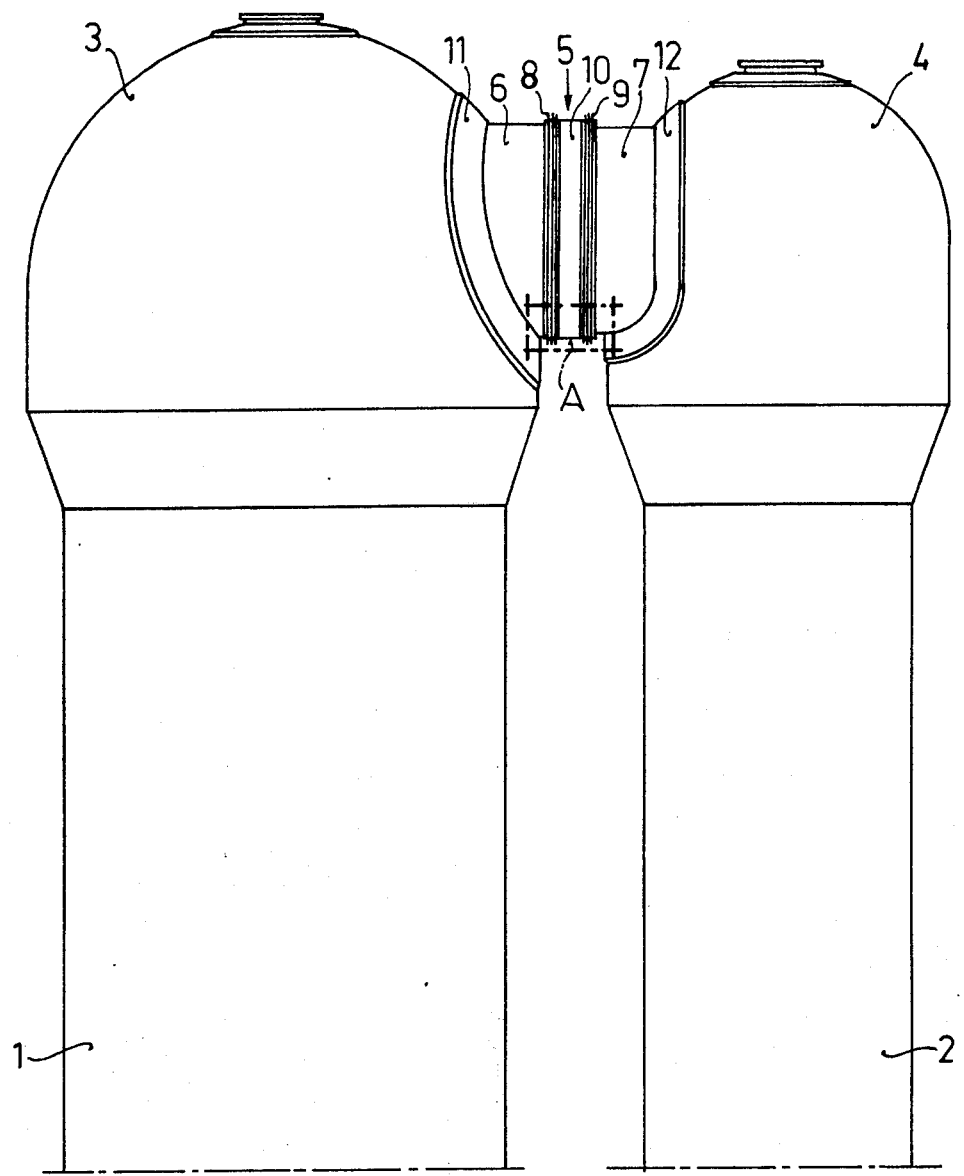
FIG. 1 is a somewhat diagrammatic detail view showing an installation provided with a connecting arrangement according to the present invention.
Figure 2:
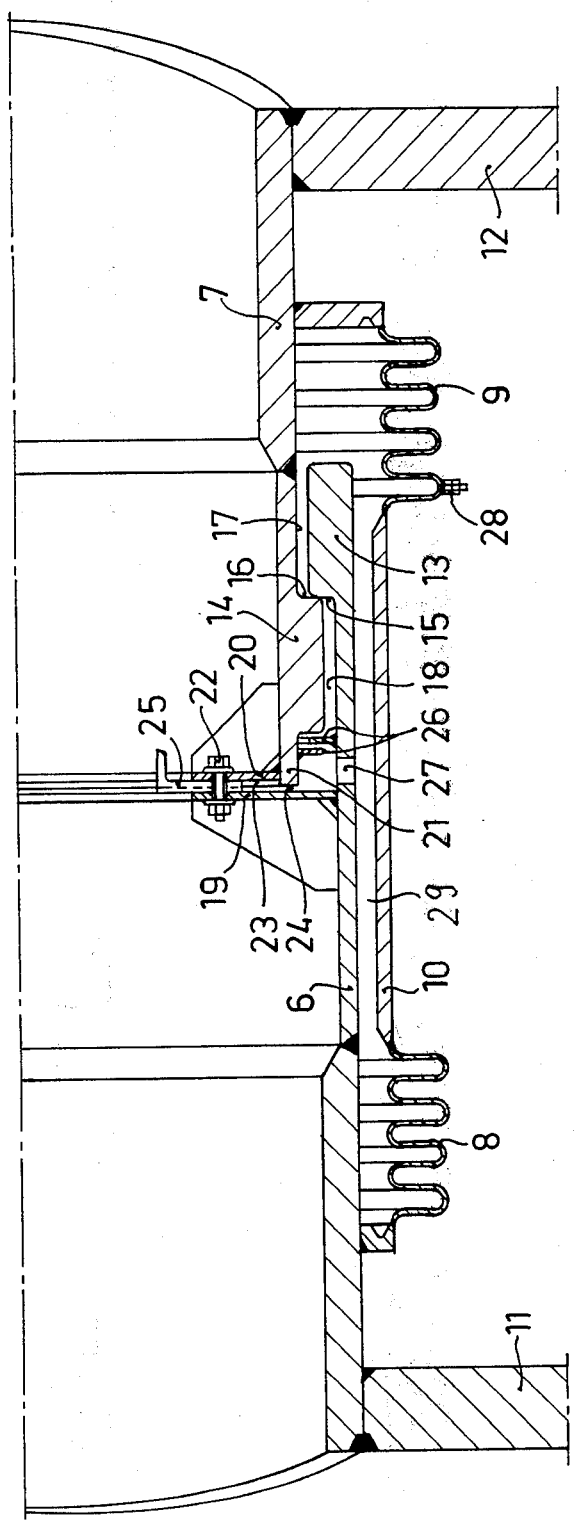
FIG. 2 is a partly sectioned fragmentary detail view of FIG. 1, illustrated on an enlarged scale.

Discussing the drawing in detail it will be seen that FIGS. 1 and 2 illustrate the connecting arrangement as employed in conjunction with two vessels, one of which is here an air heater or regenerator of a furnace, and the other of which is a combustion chamber or duct of the furnace. The regenerator is identified with reference numeral 1 and the combustion chamber or duct with reference numeral 2. The regenerator has at its upper end a cupola 3 and a similar cupola 4 is provided at the upper end of the combustion chamber 2. It is the cupolas 3 and 4 which are connected with one another by a conduit 5.

As the drawing shows, especially in FIG. 2, the conduit 5 is composed of two tubular sockets 6 and 7 of which the former is rigidly connected with the cupola 3 and the latter with the cupola 4. There is further provided a set of compensators 8 and 9 of bellows-shaped type, and between these compensators 8 and 9 there is provided a tube section 10. In the region where the sockets are connected with the cupolas 3 and 4, respectively, the surfaces of the cupolas in the illustrated embodiment, or quite generally the cupolas per se, are reinforced by reinforcements 11 and 12, respectively.

In the illustrated embodiment, and as most clearly seen in FIG. 2, the ends of the tubular sockets 6 and 7, and the sockets themselves in this case, are of different diameters. Secured rigidly, in the illustrated embodiment by welding, to the free ends of the tubular sockets 6 and 7 are annular reinforcements 13 and 14, respectively. These also have different diameters and one has an outwardly extending annular projecting whereas the other has an inwardly extending annular projection, being provided with annular shoulders 15 and 16. As the drawing shows, these shoulders 15 and 16 interengage one behind the other, because one shoulder is provided at one axial end of the reinforcement 13 and the other shoulder is provided at the opposite axial end of the reinforcement 14, so that the shoulders interengage one behind the other as illustrated. The contacting surfaces of the shoulders 15 and 16 are capable of absorbing and withstanding the significant forces resulting from the internal pressures in the regenerator 1 and the combustion chamber 2.

These aforementioned internal forces are forces which rise and decrease, that is which increase when the system is switched from the heating to the blasting period until they reach the highest value, which value they retain until the end of the blasting period whereupon a decrease takes place. With the rise in the internal pressure at the beginning of the blasting period (reference here is, of course, being made to a blast furnace having the units 1 and 2) this pressure causes an increase in the tensile forces acting upon the installation, and in the thermal expansion of the various elements which is different in the units 1 and 2 due to their different dimensions. The compensation of these different extents of expansion is effected in the present invention by the fact that the shoulders 15 and 16 have sliding freedom of radial displacement with reference to one another, so that as an expansion takes place in vertical direction (in FIG. 1) of the unit 1 with reference to the unit 2 or vice versa, such displacement is shared by the respective tubular socket 6 or 7 and results in radial displacement of the shoulders 15 and 16 with reference to one another. This is possible because, between the annular reinforcements and the respective other end of the tubular socket 6 or 7, a sufficient amount of radial gap or play 17 and 18 is provided.

The abutment of the tubular sockets 6 and 7 takes place in the region of the flanges 19 and 20. The flange 19 is rigidly connected with the tubular socket 6, in the illustrated embodiment by welding; the flange 20 is welded to a reduced-diameter extension 21 of the reinforcement 14. The two flanges 19 and 20 are connected by bolts or screws 22, and a gap 23 is left between the flanges, another gap 24 being left between the flange 19 and the free edge of the extension 21. The desired width of these gaps 23 and 24 is readily achieved by inserting angle members 25 which are removed only after the components have all been installed in their desired locations. The provision of gap 24 is to clearly define the relative movement of the tubular sockets 6 and 7, and thereby of the units 1 and 2 in direction towards one another. The bolts 22, which are in appropriately dimensioned bores, further provide the possibility of retensioning the bellows-shaped compensators 8 and 9 before the assembly is completed.

A seal of labyrinthine type is provided, here in form of annular lamellae 26 which are located between the extension 21 and the tubular socket 6. The purpose of this is to provide for a sealing of the interior of the tubular sockets 6 and 7 with respect to the surfaces of the shoulders 15 and 16, to prevent dust-like or other particulate impurities from contacting these surfaces. It is evident that if such impurities could come between these surfaces, relative displacement taking place between the surfaces would cause their scratching by the particular impurities and lead to difficulties, that is to harder sliding movement of the shoulder surfaces 15 and 16, or even to more substantial problems. The seal provided by annular lamellae 26 can of course be replaced by another type of seal.

The tubular socket which in the illustrated embodiment is designated with reference numeral 6 is further provided with at least one, and in the illustrated embodiment with a plurality of circumferentially distributed apertures 27 which facilitate the pressure compensation between the interior of the sockets 6 and 7 on the one hand, and the annular clearance 29 defined between the socket 6, the tubular member 10 and the compensators 8 and 9, on the other hand. At the same time, they are intended to prevent that the pressure adjustment take place via the contacting slide surfaces of the shoulders 15 and 16, because this could again result in the movement of particular contaminants between these surfaces.

Each of the ribs of the compensators 8 and 9 is advantageously provided with an opening 28 in the downwardly directed portion (only one opening is shown) which can be closed so that condensate which may accumulate can be drained if and when necessary.

A roller or ball bearing 30 can be interposed between the surfaces of the shoulders 15 and 16 for anti-friction purposes, as mentioned earlier and as illustrated in FIG. 3.

It will be understood that each of the elements described above, or two or more together, may also find a useful application in other types of constructions differing from the types described above.

While the invention has been illustrated and described as embodied in a connecting arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. An arrangement of the character described for connecting two vessels, comprising a first tubular socket having an axis and two axially spaced ends one of which is connected to and communicates with one vessel; a second tubular socket also having an axis and two axially spaced ends one of which is connected to and communicates with the other vessel; and means for connecting said sockets so as to establish communication between the same, prevent axial displacement thereof away from one another, and compensate for a radial displacement of one of said sockets with respect to the other socket due to differential thermal expansions of the vessels and of the connecting arrangement and due to pressure variations therein, said means including a first tubular member rigidly connected to the free end of one of said sockets and forming a coaxial extension thereof and formed with an external annular projection having a radially extending first shoulder, a second tubular member rigidly connected to the free end of the other socket forming a coaxial extension thereof at least partially surrounding and defining an annular gap with said first tubular member and being formed with an internal annular projection having a radially extending second shoulder cooperating with said first shoulder so as to prevent displacement of said tubular members away from one another while permitting radial displacement thereof with respect to one another, a first bellows member sealingly connected to said first socket, a second bellows member sealingly connected to said second socket, and a connecting sleeve sealingly connected to said first and second bellows members and surrounding with clearance at least said second tubular member and operative for compensating for said radial displacement of said tubular members with respect to one another by tilting relative to said axes, said shoulders subdividing said gap into two gap portions one communicating with the interior of said tubular members and sockets and the other communicating with said clearance, sealing lamellae arranged between said first and second tubular members and operative for shielding said shoulders at least one of said sockets and tubular members being provided with at least one aperture communicating said interior with said clearance whereby a low-resistance flow path is formed for equalizing the pressure in said clearance and in said other gap portion on the one hand with the varying pressure in said interior and said one gap portion on the other hand, at any given instant whereby contamination of said shoulders by the fluid passing through said interior is minimized.

2. An arrangement as defined in claim 1, and further comprising at least one blockable drain opening in at least one of said bellows members for draining of liquid from the same.

3. An arrangement as defined in claim 1, wherein said shoulders are provided with low-friction contact surfaces; and wherein said contact surfaces contact one another due to said axially acting forces and slide over one another due to said radially acting forces.

4. An arrangement as defined in claim 1, and further comprising bearing means interposed between said first and second shoulders and contacting the same due to said axially acting forces and operative for reducing friction when said tubular members are displaced radially with respect to one another.

* * * * *